UNITED STATES PATENT OFFICE.

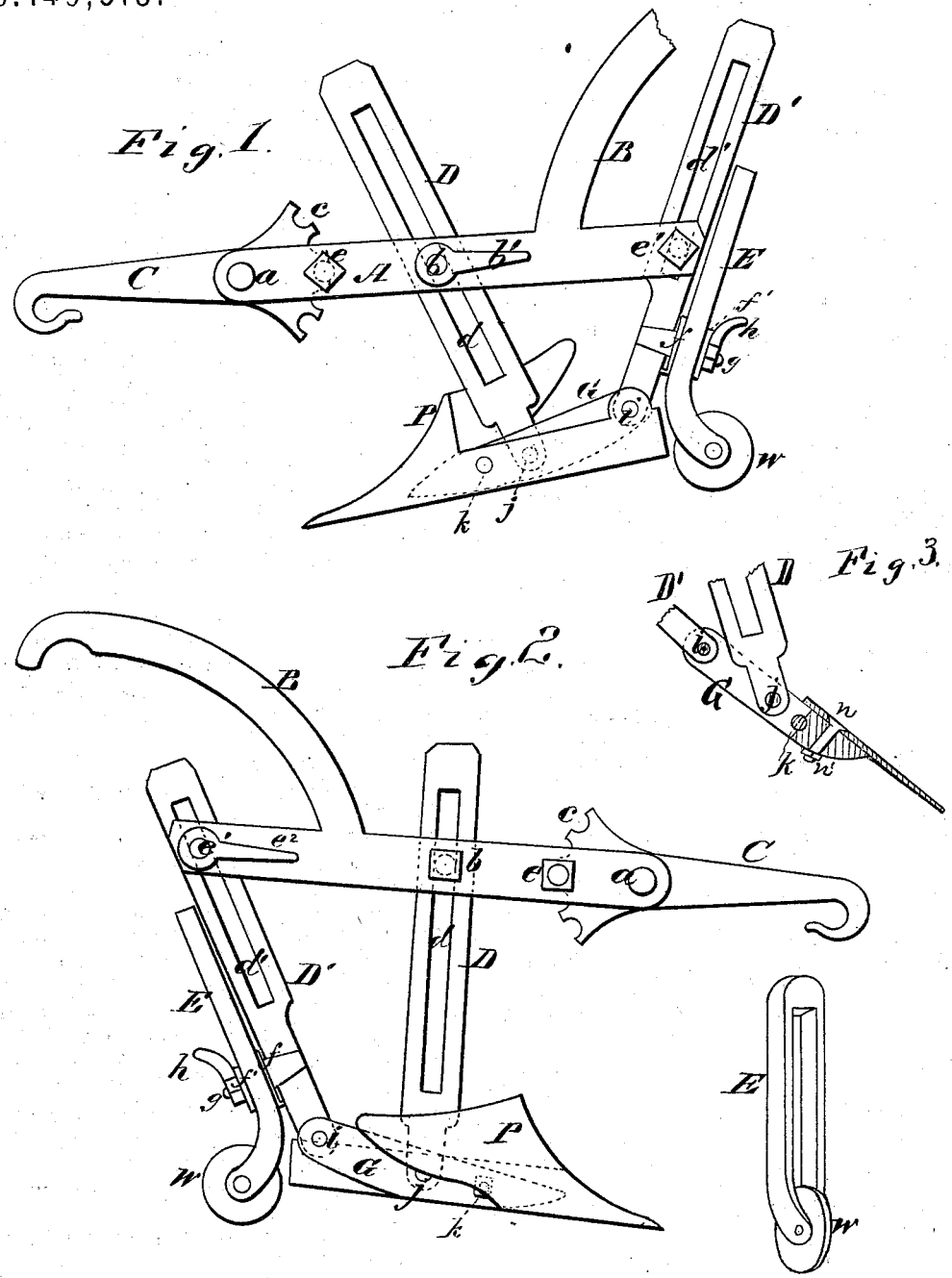

FRANÇOIS JOSEPH PETITJEAN, OF NATCHITOCHES, LOUISIANA.

IMPROVEMENT IN PLOWS.

Specification forming part of Letters Patent No. 149,518, dated April 7, 1874; application filed November 22, 1873.

*To all whom it may concern:*

Be it known that I, FRANÇOIS JOSEPH PETITJEAN, of Natchitoches, in the parish of Natchitoches and State of Louisiana, have invented a new and valuable Improvement in a Combination-Plow; and I do hereby declare that the following is a full, clear, and exact description of the construction and operation of the same, reference being had to the annexed drawings making a part of this specification, and to the letters and figures of reference marked thereon.

Figures 1 and 2 of the drawings are representations of side views of my plow. Fig. 3 is a detail view of the same.

This invention has relation to plows; and it consists in certain novel devices which are adjustable for running plows, shovels, scrapers, and other cultivating appliances, whereby a single frame is adapted for receiving such appliances, according to the kind of work to be performed, as will be hereinafter explained.

The following is a description of my improvements:

In the annexed drawings, A represents the beam, which consists of two longitudinal parts, secured together by bolts. B B are the handles or stilts, which may be welded to the beam-bars; or they may be pivoted to these bars, and made adjustable by means of set-screws, connecting them to fixed arcs. C is a draft-clevis, which is vertically adjustable about a pivot, $a$, and which can be secured rigidly to the beam A by means of a bolt, $e$, fitting into notches made in the edge of a segment, $c$. D D' are the plow-standards, which are slotted at $d\ d'$, and applied between the two bars forming the beam A. A bolt, $b$, passes through the beam A and slot $d$ of standard D, and receives a handle-nut, $b'$, on it. A bolt, $e^1$, passes through the beam A and through the slot $d'$, and receives a handle-nut, $e^2$, on it. It is by means of these nuts that the standards can be rigidly fastened to the beam A. G represents a link, made of double bars, like the beam A, and receiving between these bars the lower ends of the two standards D D', which are pivoted at $i$ and $j$. The front end of the link G is beveled downward to a point, and perforated vertically, to receive a bolt, $n$, which, with a nut, $n'$, secures a shovel or other like appliance to the link when a plow, P, is removed from it. The land-side of this plow P is rigidly but removably secured to the link G by means of bolts $i\ k$, which also secure together the two bars forming this link. E represents a longitudinally-slotted bar, having a wheel, $w$, on its lower end, by means of which the heel of the plow is supported. This bar, which is vertically adjustable, is secured to the rear standard D' by means of a screw-threaded stud, $g$, two washers, $f\ f'$, and a handle-nut, $h$.

It will be seen from the above description that the plow P can be adjusted toward or from the beam A by loosening the nuts $b'\ e^2$; also, that any desired pitch can be given to the plow-point by raising the rear standard D'; also, that when the plow P is detached from the link G, and a shovel is secured to it, as shown by Fig. 3, this shovel can be adjusted and set at any desired inclination.

What I claim as new, and desire to secure by Letters Patent, is—

The slotted standards D D', adjustably secured to the beam A, in combination with the link G, connected to the standards by pivots $i\ j$, as and for the purposes described.

In testimony that I claim the above I have hereunto subscribed my name in the presence of two witnesses.

FRANÇOIS JOSEPH PETITJEAN.

Witnesses:
HARRY PERCY,
GEORGE W. KEARNEY.